United States Patent
Kerres

(10) Patent No.: US 7,358,288 B2
(45) Date of Patent: Apr. 15, 2008

(54) POLYMER MEMBRANES

(75) Inventor: Jochen Kerres, Ostfildern (DE)

(73) Assignee: Rima Haring, Stuttgart (DE)

( * ) Notice: Subject to any disclaimer, the term of this patent is extended or adjusted under 35 U.S.C. 154(b) by 565 days.

(21) Appl. No.: 10/275,114

(22) PCT Filed: Apr. 27, 2001

(86) PCT No.: PCT/DE01/01624

§ 371 (c)(1),
(2), (4) Date: Dec. 12, 2002

(87) PCT Pub. No.: WO01/84657

PCT Pub. Date: Nov. 8, 2001

(65) Prior Publication Data

US 2004/0106044 A1    Jun. 3, 2004

(30) Foreign Application Priority Data

May 2, 2000    (DE)    ................ 100 21 106

(51) Int. Cl.
*C08K 5/41*    (2006.01)
(52) U.S. Cl. ...................... 524/167; 524/413
(58) Field of Classification Search ........... 524/167, 524/413
See application file for complete search history.

(56) References Cited

U.S. PATENT DOCUMENTS

| 4,133,941 A * | 1/1979 | Sheibley ............... 429/33 |
| 6,194,474 B1 * | 2/2001 | Kerres et al. ............ 521/27 |
| 6,465,136 B1 * | 10/2002 | Fenton et al. .......... 429/309 |
| 6,723,757 B1 * | 4/2004 | Kerres et al. ............ 521/27 |
| 6,962,959 B2 * | 11/2005 | Kurano et al. ......... 525/326.1 |

* cited by examiner

*Primary Examiner*—Peter D. Mulcahy
(74) *Attorney, Agent, or Firm*—Edward C. Kwok; MacPherson Kwok Chen & Heid LLP

(57) ABSTRACT

The invention relates to novel organic/inorganic hybrid membranes which have the following composition: a polymer acid containing —$SO_3H$, —$PO_3H_2$, —COOH or $B(OH)_2$ groups, a polymeric ease (optional), which contains primary, secondary or tertiary amino groups, pyridine groups, imidazole, benzimidazole, triazole, benzotriazole, pyrazole or benzopyrazole groups, either in the side chain or in the main chain; an additional polymeric base (optional) containing the aforementioned basic groups; an element or metal oxide or hydroxide, which has been obtained by hydrolysis and/or sol-gel reaction of an elementalorganic and/or metalorganic compound during the membrane forming process and/or by a re-treatment of the membrane in aqueous acidic, alkaline or neutral electrolytes. The invention also relates to methods for producing said membranes and to various uses for membranes of this type.

26 Claims, 4 Drawing Sheets

EDX spectrum of TJ3 membrane

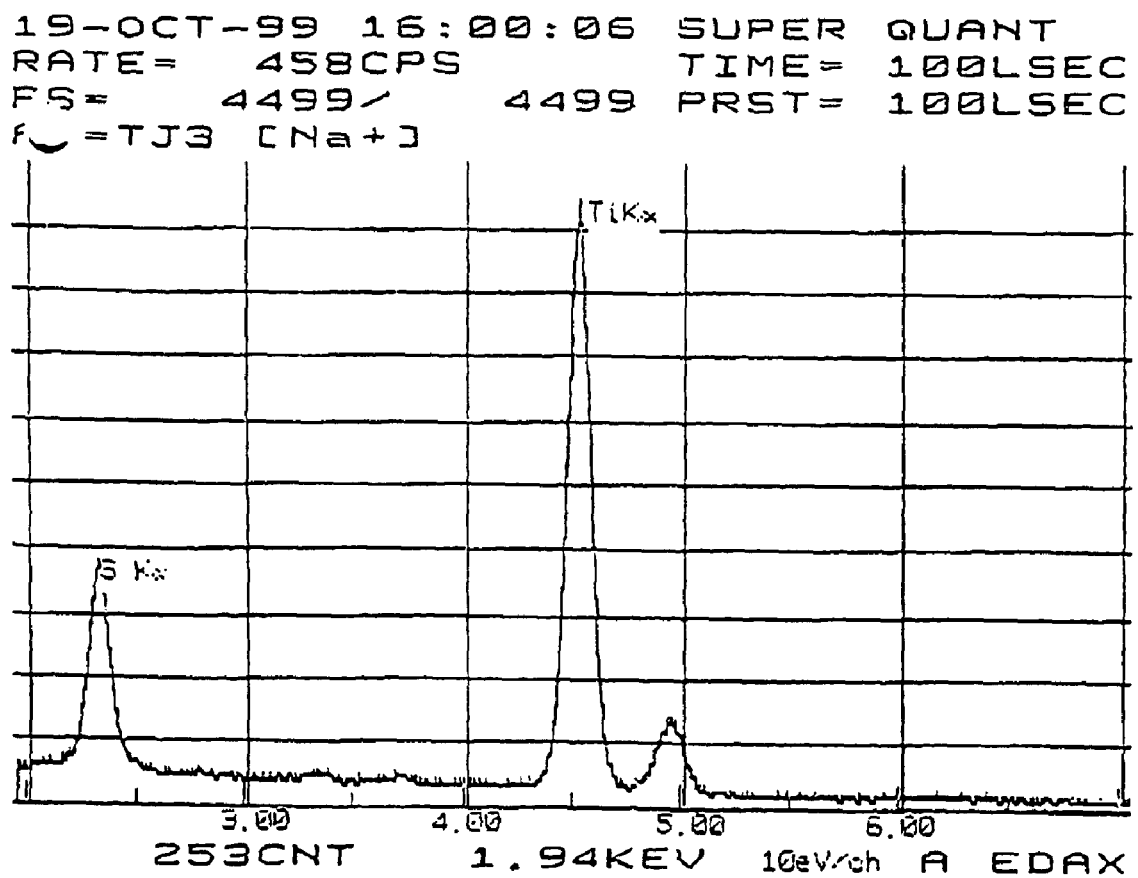
Fig. 1: EDX spectrum of TJ3 membrane

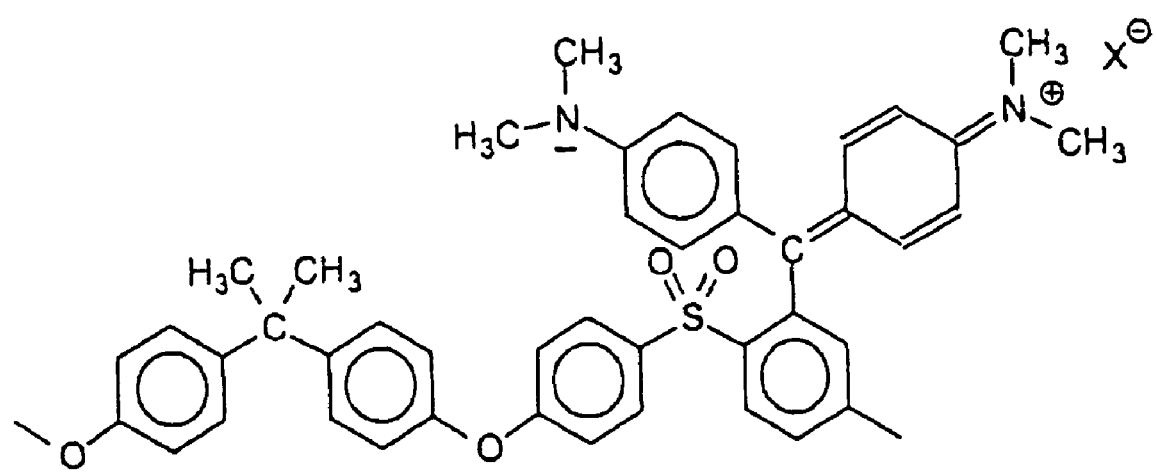
Fig. 2: polymer 1

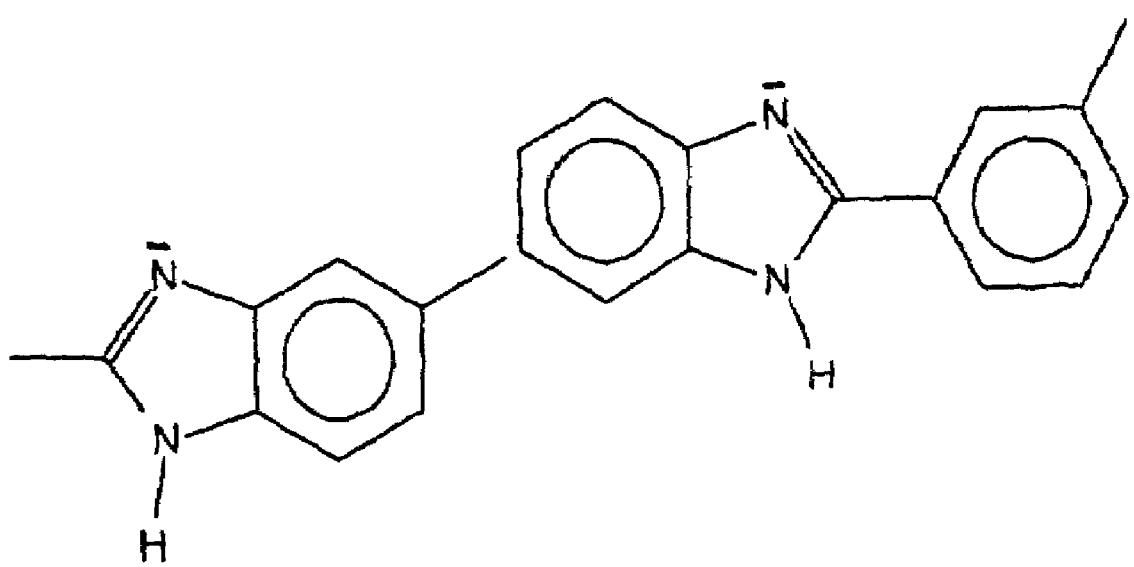
Fig. 3: PBI Celazol®

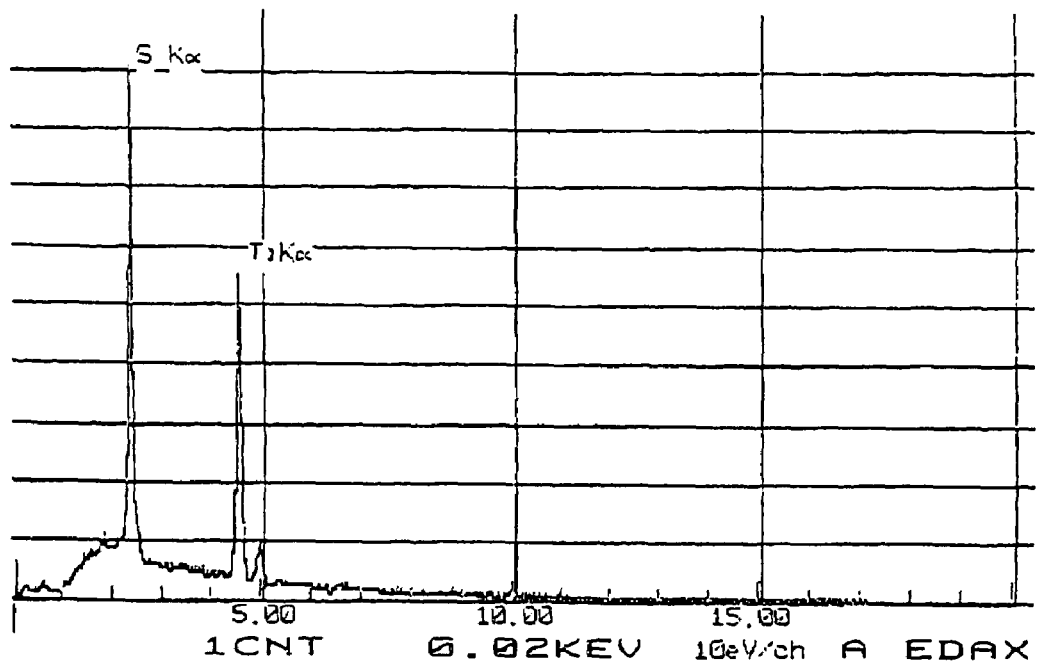
Fig. 4: EDX spectrum of JOA-2 membrane

POLYMER MEMBRANES

The invention relates to novel organic/inorganic hybrid membranes which have the following composition:
- a polymeric acid containing —$SO_3H$, —$PO_3H_2$, —COOH or $B(OH)_2$ groups
- a polymeric base (optional), which contains primary, secondary or tertiary amino groups, pyridine groups, imidazole, benzimidazole, triazole, benzotriazole, pyrazole or benzopyrazole groups either in the side chain or in the main chain.
- an additional polymeric base (optional) containing the aforementioned basic groups
- an element or metal oxide or hydroxide, which has been obtained by hydrolysis and/or sol-gel reaction of an elementorganic and/or metalorganic compound during the membrane forming process and/or by posttreatment of the membrane in aqueous acidic, alkaline or neutral electrolytes.

The invention also relates to methods for producing said membranes and to various uses for membranes of this type.

The state-of-the-art regarding ionomer/inorganic hybrid composites is exposed in the review of Mauritz, who is one of the pioneers of the implementation of sol/gel technique in organopolymers, and especially in ionomers such as Nafion® (Organic-inorganic hybrid materials: perfluorinated ionomers as sol-gel polymerization templates for inorganic alkoxides K. A. Mauritz Mat. Sci. Eng. C 6 (1998) 121-133). Core of the process is the hydrolysis of an elementorganic or metalorganic compound in the matrix of an ionically functionalized organopolymer to an element or metal oxide or hydroxide network.

Further examples of systems described in the literature are:

(a) Nafion® is preswollen in water and alcohol and then immersed in tetraethoxysilane(TEOS)/alcohol solutions. In the sulfonic acid clusters of the Nafion membrane then a sol-gel reaction takes place catalyzed by the sulfonic acid protons, from TEOS to $SiO_2$/OH networks containing water ("nanocomposites") (Microstructural evolution of a Silicon Oxide Phase in a Perfluorosulfonic Acid ionoimer by an In Situ Sol-Gel Reaction, K. A. Mauritz, I. D. Stefani this, S. V. Davis, et al. J. Appl. Polym. Sci. 55, 181-190 (1995)).

(b) Nafion® is preswollen in water and then immersed in alcohol solutions of $Zr(OBu)_4$. In the sulfonic acid clusters of the Nafion membrane then a sol-gel reaction takes place catalyzed by the sulfonic acid protons, from $Zr(OBu)_4$ to $ZrO_2$ networks containing water ("nanocomposites") (Asymmetric Nafion/(Zirconium Oxide) Hybrid Membranes via In Situ Sol-Gel Chemistry, W. Apichatachutapan, R. B. Moore, K. A. Mauirtz, J. Appl. Polym. Sci. 62, 417-426 (1996)).

(c) Nafion sulfonyl fluoride precursor membranes are preswollen in perfluorohydrophenanthrene and immersed in 3-aminopropyltriethoxysilane. Thereafter excess silane is washed out with EtOH. Hybrids are formed, in which, by hydrolysis of said silane and by reaction of said silane with $SO_2F$-groups, $SiO_2$-networks partially cross-linked with the polymer are formed in the membrane matrix (Chemical modification of a nafion sulfonyl fluoride precursor via in situ sol-gel reactions, A. J. Greso, R. B. Moore, K. M. Cable, W. L. Jarrett, K. A. Mauritz, Polymer 38, 1345-1356 (1997).

(d) Surlyn® ionomer membranes in the $Zn^{2+}$ form are swollen in 1-propanol and then immersed in $H_2O$/TEOS mixtures. In the membrane matrix then a sol-gel reaction takes place catalyzed by the sulfonic acid protons, from TEOS to $SiO_2$/OH networks containing water ("nanocomposites") (Surlyn®/[Silicon Oxide] Hybrid Materials. 2. Physical Properties Characterization, D. A. Siuzdak, K. A. Mauritz, J. Polym. Sci. Part B: Polymer Physics, 37, 143-154 (1999).

A disadvantage of the known systems (a) to (d) is, that the sol-gel reaction takes place in a preformed membrane and consequently the content of an inorganic polymer phase formed by hydrolysis, of the polymer composite can not be set at will.

Also hybrid systems of nonionic polymers and metal or element oxides are described in the literature:

(e) composites of poly(n-butylmethacrylate) and titanium oxide, made by water vapor hydrolysis of titanium alkoxides, which had been added to alcoholic solutions of a poly(n-butylmethacrylate) polymer solution, in the polymer matrix after evaporation of the solvent. (Novel Poly(n-Butyl Methacrylate)/Titanium Oxide Alloys Produced by the Sol-Gel process for Titanium Alkoxides, K. A. Mauritz, C. K. Jones, J. Appl. Polym. Sci. 40, 1401-1420 (1990)).

(f) composite membranes of polyetherimide and nanodispersed silicium oxide, made by hydrolysis of TEOS in solutions of polyetherimide Ultem® in NMP by adding of 0.15 M HCl solution. After hydrolysis dense or phase inversed membranes are made from this polymer solution. Compatibility of the inorganic with the organic phase was obtained by extra addition of 3-aminopropyltrimethoxysilane (AS) (Membranes of poly(ether imide) and nanodispersed silica, S. P. Nunes, K. V. Peinemann, K, Ohlrogge, A. Alpers, M. Keller, A. T. N. Pires, J. Memb. Sci. 157 (1999) 219-226)).

These systems present similar disadvantages as already described previously.

As the descriptions show, there are already a number of pure organic and also provided with inorganic additives proton conducting membranes, however all of these systems and membranes present poor thermal and mechanical stability, which especially impinges on regions above a temperature of 100° C.

Consequently an object of the invention is to provide novel composites and composite membranes of mixtures of cation exchange polymers and basic polymers additionally containing an inorganic element/metal oxide/hydroxide phase, which improves the following membrane properties:
- mechanical stability
- thermal stability
- improved water holding ability even at temperatures of >100° C., which is important in particular for the application in membrane fuel cells in the temperature range >100° C.

This object is solved by providing membranes according to claim 1.

Furthermore the process according to the invention contributes to solve this object.

Herein organic precursors of element/metal oxides/hydroxides are brought into the polymer solution (alkoxide/ester, acetylacetonate etc). The formation of the inorganic phase in the ionomer happens after the membrane formation by hydrolysis in acidic, alkaline and/or neutral aqueous environment.

Surprisingly it has been found, that if Ti diacetylacetonate diisopropylate/isopropanol is brought into solutions of the salt form of sulfonated poly(etheretherketone) sPEEK and a basic polymer (e.g. polybenzimidazole PBI Celazol®) in NWP or DMAc, the Ti diacetylacetonate diisopropylate does not hydrolyze in the polymer solution, but is built into the membrane matrix on evaporating of the solvent. Surprisingly it has been found, that the organic Ti compound can be hydrolyzed by successive posttreatment of the membrane in aqueous lye and/or water and/or acid via sol/gel reaction to titanium oxide nanodispersed in the membrane matrix. The titanium oxide can be identified by EDX in the membrane matrix. Thereby contents of $TiO_2$ in the membrane matrix of up to 35 weight % can be reached.

The composites according to the invention consist of:
a polymeric acid with $-SO_3H$, $-PO_3H_2$, $-COOH$ or $B(OH)_2$ groups, preferentially with an aryl main chain polymer backbone
(optionally) one or two polymeric bases which carry primary, secondary or tertiary amino groups, pyridine groups, imidazole, benzimidazole, triazole, benzotriazole, pyrazole or benzopyrazole groups either in the side chain and/or in the main chain.
an element or metal oxide or hydroxide, obtained by hydrolysis of the following classes of elementorganic and/or metalorganic compounds:
metal/element alkoxide/ester of Ti,Zr, Sn, Si, B, Al metal acetylacetonates, e.g. $Ti(acac)_4$, $Zr(acac)_4$ mixed compounds of metal/element alkoxides and metal acerylacetonates, e.g. $Ti(acac)_2(OiPr)_2$ etc.
organic amino compounds of Ti, Zr, Sn, Si, B, Al
and are producible during the membrane formation process and/or by posttreatment of the membrane in aqueous acidic, alkaline or neutral electrolytes.

Due to the nanodispersed inorganic phase brought into the membrane matrix according to the invention the profile of properties of the ionomer(blend)membranes according to the invention is strongly improved.

The new inorganic/organic hybrid acid base blend membranes according to the invention show an excellent profile of properties:
good proton conductivity
excellent thermal stability
excellent mechanical stability
limited swelling.

Especially the water holding abilities of the membrane especially at T>100° C. are strongly improved. This is achieved by the inorganic oxide/hydroxide, which is present in the membrane in nanodispersed distribution of the inorganic component. By mixing of oxide powders into ionomer membranes, as has already been proposed in some publications (Comparison of Ethanol and Methanol Oxidation in a Liquid-Feed Solid Polymer Electrolyte Fuel Cell at High Temperature A. S. Arico, P. Creti, P. L. Antonucci, V. Antonucci, Electrochem. Sol. St. Lett. 182) 66-68 (1998)), such a fine distribution of the inorganic component in the membrane matrix as with the method according to the invention, wherein the elementorganic/metalorganic compounds are hydrolyzed to the oxide only in the membrane matrix, can not be reached. Thereby the membranes according to the invention show still further advantages:
reduced methanol permeability
contribution to proton conductivity, especially at T>100° C.

BRIEF DESCRIPTION OF THE DRAWINGS

FIG. 1 shows an energy dispersion x-ray (EDX) spectrum of ionomer blend membrane TJ-3, according to one embodiment of the present invention.

FIG. 2 shows the molecular structure of a monomer of "polymer 1", used in the preparation of ionomer blend membrane JOA-2, in accordance with one embodiment of the present invention.

FIG. 3 shows the molecular structure of PBI Celazol®, used in preparation of ionmer blend membrand JOA-2, in accordance with one embodiment of the present invention.

FIG. 4 shows an EDX spectrum of ionomer blend membrane JOA-2 membrane, according to one embodiment of the present invention.

The invention shall be exemplified by some examples as follows.

Preparation of Ionomer Blend Membrane TJ-3

2 g of sulfonated polyether ether ketone Victrex® (ion exchange capacity 1,364 meq $SO_3H$/g) are dissolved in 10 g N-Methylpyrrolidinone. Subsequently 1 g of triethylamine is added to the solution to neutralize the sulfonic acid groups of the sPEEK. Hereafter 77 mg of poly(4-vinylpyridine) are added to the solution. After dissolution 5.1 g titanium(IV) bis(acetylacetonato) diisopropylate, 75 weight % solution in isopropanol, are added to the solution. Then the polymer solution film is degassed and then cast onto a glass-plate by a doctor knife to a 800 μm thick film. In a membrane dryer the solvent is removed at 100° C. After film drying the glass-plate with the polymer film is immersed in a tub with $H_2O$. The film peels off from the glass-plate. The film is posttreated for 24 h at 70° C. in 1N NaOH, and then 24 h at 70° C. in deionized water, Hereafter the film is stored at room temperature in deionized water. For the determination of the proton conductivity the film is equilibrated for 24 h in 0,5 N $H_2SO_4$ at room temperature.

| Characterization results: | |
|---|---|
| Film thickness [μm]: | 100 |
| IEC [meq $SO_3H$/g]: | 1.15 |
| Swelling [%]: | 104 |
| Permselectivity (0,5 N/0.1 N NaCl) [%]: | 78.35 |
| $R_{sp}^{H+}$ (0.5 N HCl) [Ω cm]: | 6.4 |
| $R_{sp}^{H+}$ ($H_2O$) [Ω cm]: | 16.9 |
| $R_{sp}^{Na+}$ (0.5 N NaCl) [Ω cm]: | 29.6 |

In FIG. 1 the EDX spectrum of the TJ3 membrane is shown. The Ti signal is clearly visible.

Preparation of Ionomer Blend Membrane JOA-2

3 g of sulfonated poly(etheretherketone) Victrex® (ion exchange capacity 1,75 meq $SO_3H$/g) are dissolved in 15 g N-Methylpyrrolidinone. Hereafter 0.5 g of n-propylamine are added to the solution to neutralize the sulfonic acid groups of the sPEEK. Hereafter 0.15 g of polymer 1 (FIG. 2) are added to the solution. Hereafter 1.4 g of 10.72 weight % PBI Celazol® (FIG. 3) solution are added to the solution. Hereafter 4.036 g titanium(IV) bis(acetylacetonato) diisopropylate, 75 weight % solution in isopropanol, are added to the solution. Hereafter the polymer solution film is degassed and then cast onto a glass-plate with a doctor knife to a 800 μm thick film. In a vacuum drying oven the solvents are removed first for 1 h at 75° C. and 800 mbar and then at 120° C. and at a pressure of first 800 mbar and then down to 50 mbar. After film drying the glass-plate with the polymer film is immersed in a tub with $H_2O$. The film peels off from the glass-plate. The film is posttreated for 24 h at 70° C. in 1N NaOH, and then for 24 h at 70° C. in deionized water. Thereafter the film is stored at room temperature in deionized water. For the determination of the proton conductivity the film is equilibrated for 24 h in 0,5 N $H_2SO_4$ at room temperature.

| Characterization results: | |
|---|---|
| Film thickness [μm]: | 100 |
| IEC [meq SO$_3$H/g]: | 0.97 |
| Swelling [%]: | 27.7 |
| Permselectivity [%]: | 94.9 |
| $R_{sp}^{H+}$ (0.5 N H$_2$SO$_4$) [Ω cm]: | 21.8 |
| $R_{sp}^{H+}$ (H$_2$O) [Ω cm]: | 55.6 |
| $R_{sp}^{Na+}$ (0.5 N NaCl) [Ω cm]: | 79 |

In FIG. 4 the EDX spectrum of the JOA-2 membrane is shown. The Ti signal is clearly visible.

The invention claimed is:

1. Composite or composite membrane, comprising (A) at least one polymeric acid, (B) at least one polymeric base and (C2) at least one of nanodispersed element phosphate, element hydrogenphosphate, element dihydrogenphosphate, metal phosphate, metal hydrogenphosphate, or metal dihydrogenphosphate.

2. Composite or composite membrane according to claim 1 wherein the at least one polymeric acid is an aryl main chain polymer and comprises as acidic groups SO$_3$H, PO$_3$H$_2$, COOH Or B(OH)$_2$ or salts thereof, and is chosen from the group consisting of polyethersulfones, polysulfones, polyphenyl sulfones, polyether ether sulfones, polyether ketones, polyether ether ketones, polyphenylene ethers, polydiphenylphenylene ethers, polyphenylene sulfides or is a copolymer containing at least one compound of said group.

3. Composite or composite membrane according to claim 1 wherein the at least one polymeric base contains primary, secondary or tertiary amino groups, pyridine groups, imidazole, benzimidazole, triazole, benzotriazole, pyrazole or benzopyrazole groups, either in a side chain or in a main chain.

4. Composite or composite membrane according to claim 1 further comprising a salt, elemental or metal oxide or metal hydroxide, which are obtained by hydrolysis or sol/gel reaction after membrane formation and wherein at least one non-hydrolyzed precursor of the salt, element or metal oxide or metal hydroxide is added to the at least one polymeric acid and the at least one polymeric base prior to removal of solvent.

5. Composite or composite membrane according to claim 2 further comprising a salt, elemental or metal oxide or metal hydroxide, which are obtained by hydrolysis or sol/gel reaction after membrane formation and wherein at least one non-hydrolyzed precursor of the salt, element or metal oxide or metal hydroxide is added to the at least one polymeric acid and the at least one polymeric base prior to removal of solvent.

6. Composite or composite membrane according to claim 3 further comprising a salt, elemental or metal oxide or metal hydroxide, which are obtained by hydrolysis or sol/gel reaction after membrane formation and wherein at least one non-hydrolyzed precursor of the salt, element or metal oxide or metal hydroxide is added to the at least one polymeric acid and the at least one polymeric base prior to removal of solvent.

7. Composite or composite membrane according to claim 1 further comprising a salt, elemental or metal oxide or metal hydroxide, which are non-hydrolyzed precursors selected from the group consisting of metal/element alkoxides/esters of Ti, Zr, Sn, Si, B, or Al, metal acetylacetonates, mixed compounds of metal/element alkoxides, and metal acetylacetonates, and organic amino compounds of Ti, Zr, Sn, Si, B, or Al.

8. Composite or composite membrane according to claim 2 further comprising a salt, elemental or metal oxide or metal hydroxide, which are non-hydrolyzed precursors selected from the group consisting of metal/element alkoxides/esters of Ti, Zr, Sn, Si, B, or Al, metal acetylacetonates, mixed compounds of metal/element alkoxides, and metal acetylacetonates, and organic amino compounds of Ti, Zr, Sn, Si, B, or Al.

9. Composite or composite membrane according to claim 3 further comprising a salt, elemental or metal oxide or metal hydroxide, which are non-hydrolyzed precursors selected from the group consisting of metal/element alkoxides/esters of Ti, Zr, Sn, Si, B, or Al, metal acetylacetonates, mixed compounds of metal/element alkoxides, and metal acetylacetonates, and organic amino compounds of Ti, Zr, Sn, Si, B, or Al.

10. Composite or composite membrane according to claim 1 wherein said composite and composite membrane are covalently cross-linked.

11. Composite or composite membrane according to claim 4 wherein said composite and composite membrane are covalently cross-linked.

12. Composite or composite membrane according to claim 5 wherein said composite and composite membrane are covalently cross-linked.

13. Composite or composite membrane according to claim 6 wherein said composite and composite membrane are covalently cross-linked.

14. Composite membrane according to claim 4 wherein the membrane is post-treated with phosphoric acid to generate in a membrane matrix from the metal oxide, metal hydroxide or metal oxide hydroxide, or element phosphate, hydrogenphosphate, or dihydrogenphosphate.

15. Composite membrane according to claim 10 wherein the membrane is post-treated with phosphoric acid to generate in a membrane matrix from the metal oxide, metal hydroxide or metal oxide hydroxide, or element phosphate, hydrogenphosphate, or dihydrogenphosphate.

16. Process for the preparation of a composite or composite membrane according to claim 1 comprising providing a polymer solution by mixing in a dipolar-aprotic solvent a polymeric acid with SO$_3$X, PO$_3$X$_2$, COOX or B(OX)$_2$ where X=H$^+$, protonated Triethylamine (C$_2$H$_5$)$_3$NH$^+$, protonated n-Propylamine (C$_3$H$_7$)NH$^+$, univalent or bivalent or trivalent or tetravalent metal cation; at least-one polymeric base which includes primary, secondary or tertiary amino groups, pyridine groups, imidazole, benzimidazole, triazole, benzotriazole, pyrazole or benzopyrazole groups either in a side chain or a main chain; and at least one metal organic or element organic compound of the group consisting of metal/element alkoxides/esters of Ti, Zr, Sn, Si, B, or Al, metal acetylacetonates, mixed compounds of metal/element alkoxides, and metal acetylacetonates, and organic amino compounds of Ti, Zr, Sn, Si, B, or Al.

17. Process according to claim 16 wherein said dipolar-aprotic solvent is N-methylpyrrolidinone (NMP), N,N-dimethylacetamide (DMAc), N,N-dimethylformamide (DMF), dimethylsulfoxide (DMSO) or sulfolane.

18. Process according to claim 16 wherein the polymer solution is cast as a thin film onto a support, the solvent is evaporated at a temperature of from 80° C. to 150° C. at normal pressure or under vacuum, and the thin film formed is cured as follows, whereby order of curing steps can vary and wherein steps (1) and/or (2) and/or (3) are optional: (1) in water at a temperature of 50° C. to 100° C., (2) in 1 to 100% mineral acid at a temperature of 50° C. to 100° C., and/or (3) in 1 to 50% aqueous base or in an anhydrous liquid amine or a mixture of different liquid amine.

19. Process according to claim 18 wherein said support is a glass plate, metal plate, tissue, woven material, non-woven material, fleece, porous membrane or a polymer membrane.

20. Composite or composite membrane according to claim 1 comprising an electrochemical energy producing means.

21. Composite or composite membrane according to claim 1 comprising a component in a membrane $H_2$- or direct methanol fuel cell at a temperature of from 0° C. to 180° C.

22. Composite or composite membrane according to claim 1 comprising a component of an electrochemical cell.

23. Composite or composite membrane according to claim 1 comprising a component in a secondary battery.

24. Composite or composite membrane according to claim 1 comprising a component in an electrolysis cell.

25. Composite or composite membrane according to claim 1 comprising a component in a membrane separation process.

26. Composite or composite membrane according to claim 25 wherein said separation process is gas separation, pervaporation, perstraction, reverse osmosis, electrodialysis or diffusion dialysis.

* * * * *